United States Patent [19]
Lak et al.

[11] Patent Number: 5,644,920
[45] Date of Patent: Jul. 8, 1997

[54] LIQUID PROPELLANT DENSIFICATION

[75] Inventors: Tibor I. Lak, Huntington; Steve P. Petrilla, Irvine; Martin E. Lozano, Whittier, all of Calif.

[73] Assignee: Rockwell International Corporation, Seal Beach, Calif.

[21] Appl. No.: 533,423

[22] Filed: Sep. 25, 1995

[51] Int. Cl.$^6$ .................................................... F11C 5/02
[52] U.S. Cl. ............................................ 62/47.1; 62/48.1
[58] Field of Search ...................................... 62/47.1, 48.1

[56] References Cited

U.S. PATENT DOCUMENTS

| | | | |
|---|---|---|---|
| 2,640,627 | 6/1953 | Doelter | 62/47.1 |
| 3,389,555 | 6/1968 | Goldstein et al. | 62/47.1 |
| 5,398,515 | 3/1995 | Lak | 62/47.1 |

*Primary Examiner*—Ronald C. Capossela
*Attorney, Agent, or Firm*—Harry B. Field; Steven E. Kahm

[57] ABSTRACT

Super cooling the cryogenic liquid propellant in a vehicle propellant tank densities the propellant allowing the vehicle propellant tank to carry more fuel in the same volume tank while lowering the vapor pressure and thus the tank operating pressure. Lowering the tank operating pressure reduces the stress and therefore allows the walls of the tank to be thinner. Both the smaller tank volume and thinner tank wall results in an overall smaller and lighter vehicle with increased payload capability. The cryogenic propellant can be supercooled well below the normal boiling point temperature level by transporting the liquid propellant from the vehicle tanks to a ground based cooling unit which utilizes a combination of heat exchanger and compressor. The compressor lowers the coolant fluid bath pressure resulting in a low temperature boiling liquid which is subsequently used to cool the recirculating liquid. The cooled propellant is then returned to the vehicle propellant tank. In addition to reducing the vehicle size and weight the invention also allows location of the vent valve on the ground, elimination of on-board recirculation pumps or bleed systems, smaller and lighter engine pumps and valves, lighter and more stable ullage gas, and significant reduction in tank fill operation. All of these mentioned attributes provide lower vehicle weight and cost.

11 Claims, 1 Drawing Sheet

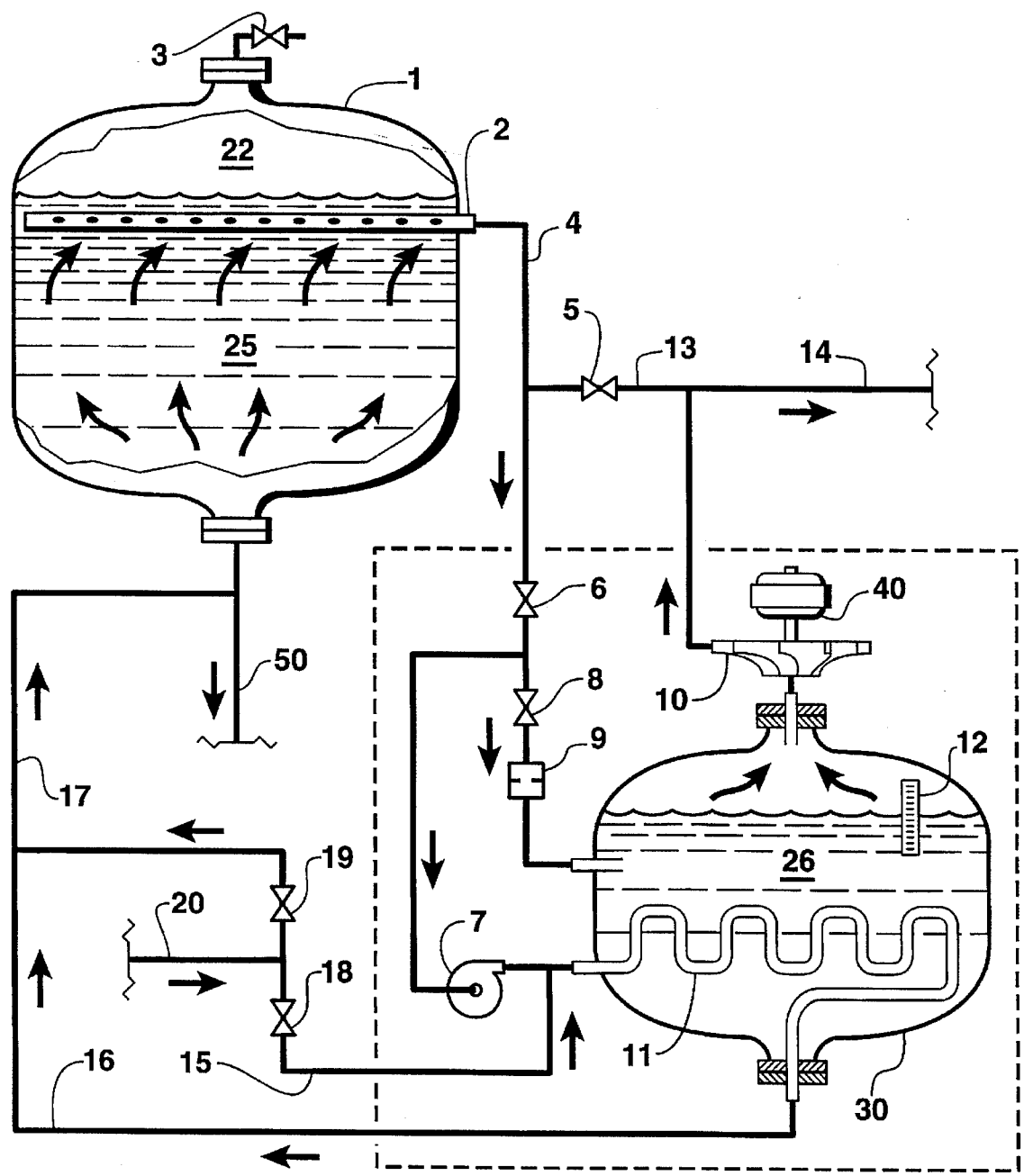

LIQUID PROPELLANT DENSIFICATION

The invention described herein was made in the performance of work under NASA contract number NAS9-18500 and is subject to the provisions of Section 305 of the National Aeronautics and Space Act of 1958 (42 U.S.C. 2457).

BACKGROUND OF THE INVENTION

Propulsion systems utilizing cryogenic liquid oxygen and/or hydrogen, such as the Space Shuttle, Atlas/Centaur, Delta, etc., are currently filled from the facility storage tanks and subsequently allowed to cool in the flight tanks in order to reject the heat absorbed by the liquid as a result of environmental heat leak, transfer line, and tank wall chilldown. The cooling of the liquid bulk is desirable in order to increase the liquid density so that more impulse mass can be stored in the tank, and also to reduce the liquid vapor pressure so that the tank operating pressure and tank weight is minimized.

Heat rejection from the liquid bulk is a relatively slow process since it depends on natural convection mechanism and liquid surface evaporation. The degree of liquid cooling through surface evaporation is also limited by the vent system flow resistance (vent valve and line) and the ambient pressure (14.7 psia). Reducing the vent system flow resistance to improve the cool down time and minimize the final bulk temperature results in a relatively large vent valve and line design which represents a vehicle payload weight penalty. Although the current means of densifying the cryogenic liquids through evaporation are simple the process is limited to the saturation density and liquid vapor pressure at one atmosphere.

SUMMARY OF THE INVENTION

A means of further cooling of the liquid cryogens below the normal boiling point has been identified in this invention in order to reduce the storage tank and propulsion vehicle size and weight. The innovation comprises a recirculation system located in the tank and a cooling unit located on the ground. Warm liquid is drawn from the top of the tank and is transported to the ground cooling unit via the recirculation system manifold and transfer line. The liquid is subsequently cooled in the ground cooling unit and recirculated back into the tank at the bottom through the use of a recirculation pump. The incoming supercooled liquid displaces the warmer liquid layer above it until the entire tank liquid mass has been supercooled to the desired higher density and lower vapor pressure level. The higher liquid density results in a smaller tank size and the lower vapor pressure results in a lower tank operating pressure. Both of these effects, smaller tank volume and lower operating pressure, result in a lighter tank and subsequently lighter vehicle design. The supercooled denser liquid also permits reduction of the main feed system diameter, and rocket engine components (pump, valves, lines) which further contributes to the overall system weight reduction. Because the liquid bulk cooldown is accomplished through recirculation flow, the time required to densify the propellant bulk can also be significantly reduced as compared to the much slower natural convection heat transfer process. Reducing the time required to densify the liquid propellant results in shorter loading operation and lower launch cost.

Since the recirculation manifold, located at the top of the tank can also serve as a vent system during tank chill and fill operation, the vent valve which is normally located on the tank can be relocated to the ground. Placing the vent valve on the ground instead of on the flight tank results in additional vehicle weight reduction, and lower operating cost since the vent valve can be reused and replaced easily.

OBJECTS OF THE INVENTION

It is an object of the invention to supercool the cryogenic liquid propellants in the tank of a propulsion vehicle in order to increase the liquid bulk density and to lower the liquid vapor pressure.

It is a further object of the invention to decrease the size and weight of the propulsion vehicle storage tanks by using a denser state of the propellant and lower operating tank pressure.

It is a further object of the invention to decrease the weight of the rocket engine by using denser propellants.

It is also an object of the invention to decrease the weight and increase the payload of the propulsion vehicle.

DESCRIPTION OF THE DRAWINGS

The FIGURE is a schematic of the propellant densification system.

DESCRIPTION OF THE PREFERRED EMBODIMENTS

Referring to the FIGURE vehicle tank 1 is shown containing a cryogenic liquid 25. The liquid 25, originally enters vehicle tank 1 from a main facility transfer line 20 connected to a source which is not shown. When the fill and drain valve 19, is open the liquid passes through main feed line 17 and begins to chill and fill vehicle tank 1. Ground vent valve 5 is open during the loading of vehicle tank 1 because the boil off generated as a result of filling the warm tank and cooling the tank down, would cause the tank to over pressurize. With the ground vent valve 5 open the gas generated in vehicle tank 1 escapes through vent line 13 to facility line 14 where it can be recaptured in the facility or dumped. Removing the vent valve from vehicle tank 1 and placing it on the ground reduces the weight of the vehicle to which vehicle tank 1 is connected. (Emergency relief valve 3 is installed on vehicle tank 1 for in-flight pressure relief in case of a pressurization system failure during ascent of the vehicle. Emergency relief valve 3 is not used on the ground. It is only there to protect the vehicle after lift-off.) When the liquid level in vehicle tank 1 gets above the recirculation manifold 2, there is a transition from flowing of gas in the recirculation line 4 to flowing of a liquid. The liquid 25 in the vehicle tank 1 must cover the recirculation manifold 2 so that the liquid can enter the recirculation manifold 2 and be transported in recirculation line 4 out of the vehicle to ground cooling apparatus. Ground vent valve 5 is then closed, the heat exchanger 11, and recirculation pump 7, is primed and supercooling of the liquid through the heat exchanger 11, begins.

The flow from recirculation line 4 to the heat exchanger tank 30 is split into two paths. One path is for a liquid bath 26 in a heat exchanger tank 30 which is used to evaporatively cool the liquid in heat exchanger 11. This flow passes through pump isolation valve 6, heat exchanger flow control valve 8, and metering orifice 9 to heat exchanger tank 30. Compressor 10 having motor 40 lowers the pressure in the heat exchanger tank to ~0.2 psia above the fluid triple point pressure so that only liquid and vapor phase (no solid phase) is present in the heat exchanger tank 30. This low pressure level in heat exchanger bath 30 also reduces the bath temperature and the temperature of the liquid entering the heat exchanger tank 30 as a result of liquid flashing to the low bath pressure. The vapor exhaust from the heat exchanger tank 30 is subsequently vented by line 14 to an environmentally suitable capture device (not shown) for recirculation or disposal, or to be dumped, if it is safe to do so. A liquid level sensor 12 inside of the heat exchanger tank 30 is used to regulate heat exchanger flow control valve 8 which meters the amount of liquid in liquid bath 26 such that it covers the heat exchanger tubes 11.

A variation to the coolant flow discussion above is to use a different liquid than the liquid that is being cooled in order to generate a lower heat exchanger bath temperature. As an example, using liquid nitrogen boiling at subatmospheric pressure results in a much lower bath temperature than liquid oxygen boiling at the same pressure. Consequently use of liquid nitrogen to cool liquid oxygen will result in a lower liquid oxygen temperature, higher density, and lower vapor pressure than if liquid oxygen is used as a coolant fluid. If a different liquid is used the coolant flow is supplied from the coolant storage tank (not shown) via heat exchanger control valve 8 and flow metering orifice 9.

The second path for the liquid from recirculation line 4 is through pump isolation valve 6 and recirculation pump 7 to heat exchanger coils 11 which is cooled by the colder boiling liquid in liquid bath 26. The cooled liquid leaves heat exchanger tank 30 by way of return line 16 to the main feed line 17 for introduction to the bottom of vehicle tank 1. The relatively high recirculation flow of the liquid 25 in vehicle tank 1, illustrated by the arrows in the tank, results in a much faster cooldown of liquid 25 than is presently possible. Present systems rely on natural convection liquid motion induced by liquid surface evaporation. Further since the compressor in heat exchanger tank 30 allows the liquid to be cooled to a lower temperature than evaporative cooling in vehicle tank 1 the liquid 25 can be colder and therefore denser than would otherwise be possible. This allows the vehicle tank 1 to carry more propellant. The loading and cooling times are reduced by this method of cooling the propellant, which is a savings in terms of turning around the vehicle. Further the window for launch times can be extended by keeping the tanks full and cold for longer periods of time.

As the liquid in the vehicle tank 1 cools and densities, more propellant has to be added to the vehicle tank 1. More propellant must also be added to replace what is lost through the compressor and vent lines if the same liquid is used as a coolant fluid.

To add colder denser liquid propellant to the system the propellant from the source enters the system through main facility transfer line 20. Fill and drain valve 19 is closed and ground replenishment valve 18 is opened allowing the propellant to flow through heat exchanger coils 11 to be cooled and densified before entering vehicle tank 1 by way of main feed line 17.

Optional engine cooling line 50 may be used to cool the engines pumps and valves prior to ignition by diverting part of the recirculation flow to cool the engine hardware. On-board recirculation pumps or overboard bleed systems are currently required to maintain the engine at the cryogenic liquid temperature prior to start. The recirculation pump or bleed systems operate for many hours making sure that the engine components are at liquid temperature before ignition. With the ground cooling unit recirculation pump 7 can provide the necessary pressure rise to recirculate flow through the engine components. By plumbing and flowing subcooled liquid from the main feed line 17 through the engines, the on-board recirculation pumps or overboard bleed system could be eliminated, resulting in additional vehicle weight and cost savings.

During the liquid bulk cooling and densification process vehicle tank 1 is pressurized to the engine pre-pressurization level with a non condensable gas 22 such as helium. Vehicle tank 1 is pressurized in order to provide subcooled liquid at the recirculation manifold inlet 2, furnish net positive suction pressure at the recirculation pump, and provide positive pressure in the tank. There are two other benefits achieved by replenishing liquid 25 in the vehicle tank 1 under pressure. One of the benefits is that additional tank volume is available to lead more liquid mass due to tank volume increase with pressure.

The other benefit of replenishing vehicle tank 1 under pressure for 1 to 2 hours, while the liquid propellant 25 is cooled, is that more helium pressurant gas can be stored into the ullage of vehicle tank 1 than is presently done with current launch vehicles, such as the Space Shuttle which is pressurized during the last 2–3 minutes. By replenishing the liquid under pressure for a longer time period the helium gas is able to cool down to near the liquid bulk temperature resulting in a denser gas loaded in the same volume. The benefit of having more helium gas with liquid oxygen is that less gaseous oxygen is required to pressurize the tank during ascent, resulting in a lighter gas mass at engine shutdown and more liquid available as impulse propellant. Both the lighter gas mass and additional liquid impulse propellant results in additional payload capability.

The use of helium with liquid hydrogen does not result in lower gas mass, however it is still beneficial since the ullage gas is more stable at engine start and lift-off transient since it is saturated with a non-condensable helium gas.

Because the supercooled liquid oxygen and hydrogen is denser than the normal boiling point liquid, the engine turbopumps can be smaller or operate at a lower speed which results in unit life increase. Further vehicle weight reduction can therefore be achieved since the unit size of the engine components can be reduced with the supercooled denser propellants.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. Apparatus for liquid densification in a vehicle liquid propellant tank comprising:

a vehicle tank for containing a liquid propellant, a recirculation manifold in the vehicle tank for removing liquid propellant from the vehicle tank, a heat exchanger tank for holding a liquid coolant, a heat exchanger in the heat exchanger tank, for immersion in the liquid coolant, a recirculation line connecting the recirculation manifold in the vehicle tank to the heat exchanger for transporting liquid propellant to the heat exchanger for being cooled, a return line connecting the heat exchanger to the vehicle tank, for transporting cooled liquid propellant to the vehicle tank and lowering the temperature of the propellant therein, a compressor attached to the heat exchanger tank for lowering the liquid coolant vapor pressure and temperature, thereby cooling the liquid propellant in the heat exchanger.

2. Apparatus for liquid densification in a vehicle liquid propellant tank as in claim 1 wherein:

the recirculation line splits into a first portion for supplying liquid propellant to the heat exchanger tank and a second portion for transporting liquid propellant to the heat exchanger, such that the liquid propellant is the liquid coolant in the heat exchanger tank.

3. Apparatus for liquid densification in a vehicle liquid propellant tank as in claim 1 wherein there is:

a main feed line connected to the vehicle tank to fill, replenish and drain the vehicle tank from a liquid propellant source.

4. Apparatus for liquid densification in a vehicle liquid propellant tank as in claim 1 wherein there is:

a recirculation pump is connected to the recirculation line to pump the liquid propellant through the system.

5. Apparatus for liquid densification in a vehicle liquid propellant tank as in claim 1 wherein:

an emergency vent valve is attached to the vehicle propellant tank for venting.

6. Apparatus for liquid densification in a vehicle liquid propellant tank as in claim 1 wherein:

a vent valve located on the ground is connected to the recirculation line for venting the vehicle tank.

7. Apparatus for liquid densification in a vehicle liquid propellant tank as in claim 1 wherein:

the vehicle tank has a top and a bottom, the recirculation manifold is near the top of the vehicle tank and the return line is near the bottom of the vehicle tank for circulating the liquid propellant in the vehicle tank.

8. Apparatus for liquid densification in a vehicle liquid propellant tank as in claim 1 wherein:

a liquid level sensor controls a heat exchanger flow control valve for keeping the heat exchanger coils immersed in liquid propellant.

9. A method for liquid densification in a vehicle liquid propellant tank comprising:

storing a liquid propellant in a vehicle tank, moving the liquid propellant from the vehicle tank to a heat exchanger through a recirculation line, introducing a bath of liquid coolant to the heat exchanger, passing liquid propellant through a heat exchanger coil immersed in the bath of coolant, thereby cooling the liquid propellant in the heat exchanger, lowering the vapor pressure in the heat exchanger by a compressor, thereby evaporatively cooling the liquid coolant in the heat exchanger, moving the cooled liquid propellant from the heat exchanger to the vehicle tank in a main feed line, thereby cooling the liquid propellant in the vehicle tank.

10. A method for liquid densification in a vehicle liquid propellant tank as in claim 9 including the steps of:

venting the liquid propellant from the recirculation line.

11. A method for liquid densification in a vehicle liquid propellant tank as in claim 9 including the steps of:

pumping the liquid propellant though the heat exchanger coil.

* * * * *